United States Patent
Kawasumi

(10) Patent No.: US 8,857,996 B2
(45) Date of Patent: Oct. 14, 2014

(54) ILLUMINATION OPTICAL SYSTEM AND IMAGE PROJECTION APPARATUS

(75) Inventor: Takehito Kawasumi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/439,740

(22) Filed: Apr. 4, 2012

(65) Prior Publication Data
US 2012/0262679 A1 Oct. 18, 2012

(30) Foreign Application Priority Data

Apr. 13, 2011 (JP) .................. 2011-089374
Feb. 17, 2012 (JP) .................. 2012-033155

(51) Int. Cl.
*G03B 21/14* (2006.01)
*H04N 9/31* (2006.01)
*H04N 5/74* (2006.01)

(52) U.S. Cl.
CPC ........... *H04N 9/3152* (2013.01); *H04N 5/7441* (2013.01)
USPC ............ 353/38; 353/20; 353/85; 353/94; 353/102; 349/7; 349/96

(58) Field of Classification Search
USPC ......... 353/20, 30–31, 34, 37–38, 85, 94, 102; 349/5, 7–11, 96; 359/351, 619, 627, 359/851, 858, 861; 348/744–747, 750, 758, 348/759, E5.142, E9.027
See application file for complete search history.

(56) References Cited

U.S. PATENT DOCUMENTS

| | | | |
|---|---|---|---|
| 6,332,684 B1 * | 12/2001 | Shibatani et al. | 353/31 |
| 7,589,900 B1 | 9/2009 | Powell | |
| 8,089,696 B2 * | 1/2012 | Sudo | 359/622 |
| 8,637,799 B2 * | 1/2014 | Oku | 250/208.1 |
| 2003/0174294 A1 | 9/2003 | Yanagisawa | |
| 2003/0234983 A1 * | 12/2003 | Baba | 359/619 |
| 2005/0078367 A1 | 4/2005 | Kamijima | |
| 2006/0290903 A1 * | 12/2006 | Inoko et al. | 353/102 |
| 2007/0058133 A1 * | 3/2007 | Totani | 353/20 |
| 2009/0002634 A1 * | 1/2009 | Kadowaki et al. | 353/20 |
| 2009/0284838 A1 | 11/2009 | Sudo | |

FOREIGN PATENT DOCUMENTS

| | | |
|---|---|---|
| CN | 1445563 A | 10/2003 |
| JP | 10115870 A1 | 5/1998 |
| JP | 2003090981 A | 3/2003 |
| JP | 2005-070631 A | 3/2005 |

\* cited by examiner

*Primary Examiner* — Sultan Chowdhury
(74) *Attorney, Agent, or Firm* — Canon USA, Inc. IP Division

(57) ABSTRACT

An illumination optical system include a first lens array including multiple lens cells that split a light beam emitted from a light source into multiple light beams, a second lens array including lens cells that the light beams split by the lens cells of the first lens array are incident thereon, and an optical element configured to illuminate an image display element by superposing light beams emerging from the second lens array on the image display element. At least one of the first lens array and the second lens array includes at least two lens cells each having a curved surface that is formed so as to be continuous with a curved surface of an adjacent lens cell, the at least two lens cells being decentered, and at least two lens cells of the first lens array have different radii of curvature.

11 Claims, 14 Drawing Sheets

| CELL NUMBER | CELL THICKNESS [mm] | FOCAL LENGTH [mm] | RADIUS OF CURVATURE [mm] |
|---|---|---|---|
| R4 | 9.14 | 68.83 | 32.63 |
| R3 | 6.01 | 65.70 | 31.14 |
| R2 | 3.99 | 63.68 | 30.18 |
| R1 | 3.00 | 59.69 | 28.29 |
| L1 | 3.00 | 59.69 | 28.29 |
| L2 | 3.99 | 63.68 | 30.18 |
| L3 | 6.01 | 65.70 | 31.14 |
| L4 | 9.14 | 68.83 | 32.63 |

ILLUMINATION OPTICAL SYSTEM AND IMAGE PROJECTION APPARATUS

BACKGROUND OF THE INVENTION

1. Field of the Invention

The present invention relates to an illumination optical system including a lens array that splits a light beam emitted from a light source into multiple light beams and also relates to an image projection apparatus including the illumination optical system.

2. Description of the Related Art

An illumination optical system heretofore known includes a first fly's eye lens, which splits a light beam emitted from a light source into multiple light beams, and a second fly's eye lens, which includes multiple lens cells corresponding to the first fly's eye lens, in order to uniformly and efficiently illuminate an illumination surface of, for example, a liquid crystal display element.

The English abstract of Japanese Patent Laid-Open No. 10-115870 (Patent Document 1) discloses an illumination optical system in which decentered lenses are adopted as lens cells that constitute a first fly's eye lens or a second fly's eye lens to improve parallelism of light beams and reduce the amount of light loss in the illumination optical system.

US 2003/0174294 (Patent Document 2) and the English abstract of Japanese Patent Laid-Open No. 2003-090981 (Patent Document 3) each disclose an illumination optical system in which thicknesses of lens cells, which constitute a first fly's eye lens or a second fly's eye lens, are made different from one another in a stepwise manner in accordance with their amounts of decentering so that curved surfaces of the decentered lens cells are substantially continuous with one another.

However, there is a problem with the technology disclosed in Patent Document 1 in that a shadow is generated in an illumination area because the curved surfaces of the decentered lens cells are discontinuous and steps exist between the decentered lens cells (FIG. 11A).

In the technologies disclosed in Patent Documents 2 and 3, thicknesses of the lens cells are made different from one another so that the curved surfaces of the decentered lens are continuous with one another. However, the technologies have a problem in that, by making thicknesses of the lens cells different, principal points of the lens cells are displaced in an optical axis direction and consequently split light beams do not converge at target convergent points (FIG. 11B).

When decentered lenses are adopted as the lens cells constituting the first fly's eye lens and curved surfaces of the lens cells are continuous with one another as illustrated in FIG. 12, positions at which split light beams split by the lens cells of the first fly's eye lens maximally converge are displaced from principal points of lens cells of the second fly's eye lens. The reference signs x in FIG. 12 schematically indicate how much principal points of lens cells are displaced from a principal point of the lens cell on the optical axis of the illumination optical system, and how much focus points of split light beams from the lens cells are displaced from a focus point of a split light beam from the lens cell on the optical axis. Due to the displacement, some of the split light beams that are supposed to be incident on the corresponding lens cells are unintentionally made incident on adjacent lens cells and illuminate an area outside of an effective area of a liquid crystal display element. Accordingly, some amount of light loss occurs.

SUMMARY OF THE INVENTION

The present invention provides an illumination optical system and an image projection apparatus including the same that can reduce the amount of light loss even when curved surfaces of decentered lens cells are continuous with one another.

In order to solve the above problems, the illumination optical system according to the present invention is an illumination optical system that includes a first lens array including multiple lens cells that split a light beam emitted from a light source into multiple light beams, a second lens array including lens cells that the light beams split by the lens cells of the first lens array are incident thereon, and an optical element configured to illuminate an image display element by superposing light beams emerging from the second lens array on the image display element. At least one of the first lens array and the second lens array includes at least two lens cells each having a curved surface that is formed so as to be continuous with a curved surface of an adjacent lens cell, the at least two lens cells being decentered, and at least two lens cells of the first lens array have different radii of curvature.

Further features of the present invention will become apparent from the following description of exemplary embodiments with reference to the attached drawings.

DESCRIPTION OF THE EMBODIMENTS

Figure 1:
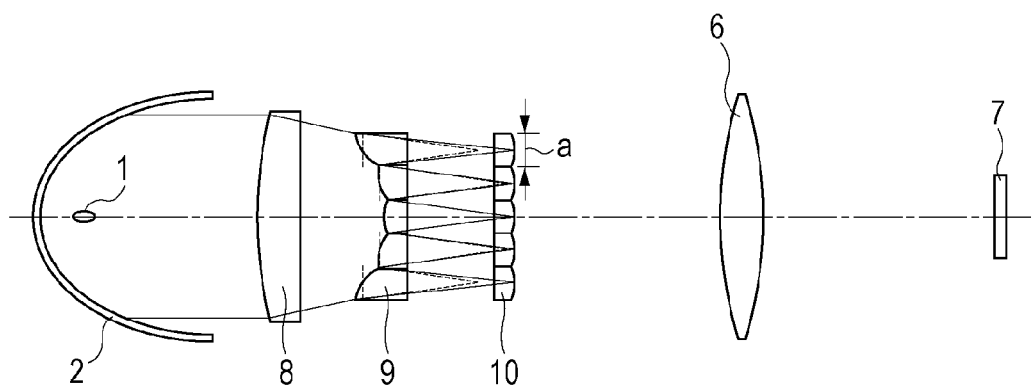
FIG. 1 is a schematic diagram of an illumination optical system according to a first embodiment of the present invention.

Referring to the drawings, embodiments of the present invention will be described in detail below.

First Embodiment

FIG. 1 is a schematic diagram illustrating an illumination optical system according to a first embodiment of the present invention. FIG. 1 illustrates a light source 1, a parabolic reflector 2, a converging lens 8, a first fly's eye lens (first lens array) 9, a second fly's eye lens (second lens array) 10, a condenser lens (optical element) 6, and a liquid crystal display element (image display element) 7. The first fly's eye lens 9 is formed by arranging rectangular lens cells, which have similar figures to the liquid crystal display element 7, in a matrix. The second fly's eye lens 10 includes multiple lens cells corresponding to the lens cells of the first fly's eye lens 9.

Light emitted from the light source 1 is reflected by the parabolic reflector 2 and becomes substantially parallel light beams. The substantially parallel light beams are incident on the converging lens 8 and changed into converged light by the converging lens 8. The converged light is incident on the first fly's eye lens 9.

The lens cells constituting the first fly's eye lens 9 are decentered, and the amount by which the center of curvature is displaced from the center of each lens cell (referred to as a decentering amount, below) increases stepwise from a lens cell near the optical axis toward a lens cell in a peripheral portion. Furthermore, the thicknesses of the lens cells in the optical axis direction increase stepwise the closer a lens cell is disposed to a peripheral portion so that the curved surfaces of the lens cells are substantially continuous with one another. Accordingly, the principal points of the lens cells are displaced in a translational manner further toward the light source the closer a lens cell is disposed to a peripheral portion. The first fly's eye lens as a whole has a recessed shape on the light source side, and a flat shape on the second fly's eye lens side.

Note that the expression "a lens cell is decentered" herein refers to a situation where an optical axis of one lens cell (a straight line connecting centers of curvature of two surfaces of the lens cell) does not coincide with a line that passes through the center of the lens cell and that is parallel to the optical axis. In this embodiment, lens cells of the first fly's eye lens 9 other than a lens cell in the center are decentered when viewed in the same direction as shown in FIG. 1 and in a direction that is parallel to the direction of FIG. 1.

Also note that the expression "curved surfaces are continuous with one another" herein refers to a situation where curved surfaces of adjacent lens cells are in contact with one another. In other words, curved surfaces of adjacent lens cells are joined to (or in contact with) one another at their ends (or ends of curved surfaces of adjacent lens cells are positioned at the same position).

In the split light beam emerging from each lens cell of the first fly's eye lens 9, part of the light beam passing through the center of the lens cell becomes substantially parallel to the optical axis due to decentering of the lens cell. The split light beam converges to a corresponding one of the lens cells of the second fly's eye lens 10. The split light beam maximally converges (is focused) around the second fly's eye lens 10 and forms an image of the light source 1 thereon. After that, the light beam becomes divergent light again, is incident on the condenser lens 6, and is superposed on the liquid crystal display element 7 by the condenser lens 6.

Figure 13:
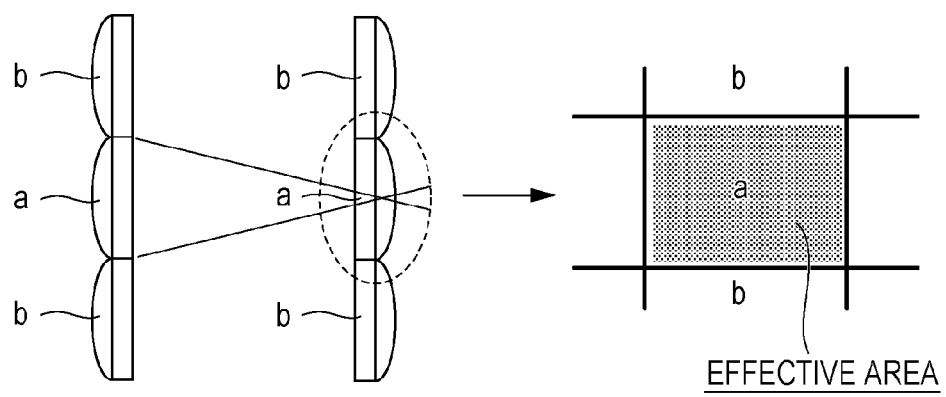
FIG. 13 is a schematic diagram of an effective area of a second fly's eye lens.

If all the lens cells of the first fly's eye lens 9 have the same radius of curvature, generally, the positions at which split light beams maximally converge are displaced farther from effective areas (a range indicated by a in FIG. 1 or a shaded part in FIG. 13) of the lens cells of the second fly's eye lens 10 the closer a lens cell of the first fly's eye lens is disposed to a peripheral portion of the first fly's eye lens. Consequently, the widths of the split light beams in the effective areas of the corresponding lens cells of the second fly's eye lens 10 increase, and a larger amount of light travels outside of the effective areas of the corresponding lens cells of the second fly's eye lens 10. The parts of the light that are not incident on the corresponding lens cells are condensed by the condenser lens 6 to a portion that is outside of an effective area of the liquid crystal display element 7. Accordingly, an amount of light loss corresponding to that of the parts of the light occurs. Note that FIG. 13 schematically illustrates a first lens array and a second lens array on the left, and illustrates a portion of the second lens array surrounded by the dotted line in an enlarged manner on the right.

The inventors of the present application have focused attention on the fact that the amount of the light beams travelling through the effective areas of the lens cells of the second fly's eye lens or effective areas of a polarization conversion element has to be increased to reduce the amount of light loss in the illumination optical system. Thus, the inventors have appropriately set the radius of curvature of each lens cell of the first fly's eye lens 9 such that the split light beams maximally converge in the effective areas of the lens cells of the second fly's eye lens 10.

In this embodiment, the radii of curvature of the lens cells of the first fly's eye lens 9 increase the closer a lens cell is disposed to a peripheral portion so that the split light beams maximally converge in the effective areas of the lens cells of the second fly's eye lens 10. In other words, a lens cell that is disposed farther (further outward) from the optical axis has a larger radius of curvature than a lens cell that is disposed on an inner side. To put it another way, the radii of curvature of the lens cells of the first fly's eye lens 9 are set such that paraxial split light beams that pass through the lens cells of the second fly's eye lens 10 have such widths that the light beams converge in the effective areas of the lens cells of the second fly's eye lens 10.

Specifically, the radius of curvature of each lens cell of the first fly's eye lens 9 is set such that a combined focal length of the converging lens 8 and the lens cell of the first fly's eye lens 9 increases by an amount equal to displacement of the principal point of the lens cell of the first fly's eye lens 9 (toward the liquid crystal display element 7).

As described above, according to the embodiment of the present invention, an illumination optical system that reduces the amount of light loss by appropriately setting the radii of curvature of the decentered lens cells can be provided. The illumination optical system according to the embodiment also has an effect of reducing the occurrence of shadows in an illumination area since the curved surfaces of the lens cells are continuous with one another, and an effect of improving the yield in a process of producing the fly's eye lens.

Figure 2:
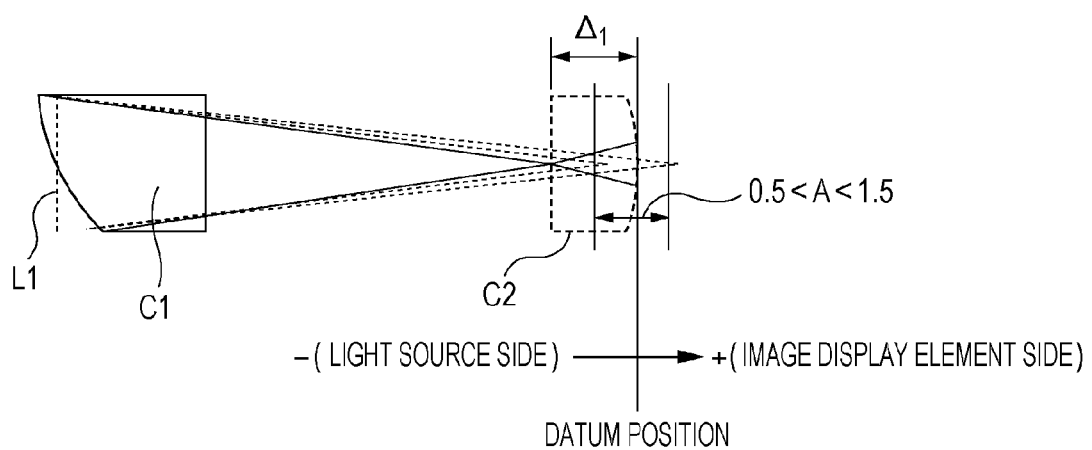
FIG. 2 illustrates a convergent point of a split light beam.

Referring now to FIG. 2, the embodiment will be described further. FIG. 2 illustrates a decentered lens cell C1 of the first fly's eye lens, a lens cell C2 of the second fly's eye lens, and a line L1 that is perpendicular to the optical axis and passes through a point at which the center of the effective area of the lens cell C1 and the curved surface of the lens cell C1 cross each other. Part of the parallel light beam that is incident on the curved surface in a range of the line L1 converges. The solid line indicates a split light beam emerging from the decentered lens cell C1 in which the radius of curvature has not been appropriately set. Here, the expression "the radius of curvature has not been appropriately set" refers to a situation where, for example, the lens cells of the first fly's eye lens are decentered lens cells, the curved surfaces of the lens cells are continuous with one another, and all the lens cells have the same radius of curvature. If such a first fly's eye lens is used, a split light beam emerging from the decentered lens cell C1 maximally converges at a position that is far from a principal plane of the lens cell C2 as indicated by the solid line, although it is desirable that the split light beam maximally converge to the principal plane.

In this embodiment, the lens cells of the first fly's eye lens are decentered lens cells and the curved surfaces of the lens cells are continuous with one another. However, the radius of curvature of the decentered lens cell C1 is made different from other lens cells so that the split light beam maximally converges at an appropriate position.

Here, the principal plane of the lens cell C2 of the second fly's eye lens 10 is taken as a datum position, and a position at which a split light beam split by a lens cell having a radius of curvature that has not been appropriately set maximally converges is denoted by $\Delta_1$ with respect to the datum position. The position $\Delta_1$ takes a positive (+) value on a liquid crystal display element side in the optical axis direction with respect to the datum position, and takes a negative (−) value on a light source side in the optical axis direction with respect to the datum position. When a convergent point of a split light beam emerging from each lens cell of the first fly's eye lens 9 according to the embodiment is denoted by $-A \times \Delta_1$, it is preferable that the radii of curvature of the lens cells of the first fly's eye lens 9 be set such that a coefficient A falls within a range of the following expression (1):

$$0.5 \leq A \leq 1.5 \qquad (1).$$

When the expression (1) is satisfied, the split light beam is corrected as indicated by dotted lines in FIG. 2, so that the split light beam maximally converges at an appropriate position.

Although all the lens cells of the first fly's eye lens 9 may be set so as to satisfy the expression (1), the effect of the embodiment of the present invention can be obtained even when not all the lens cells are set so as to satisfy the expression (1).

It is considered that the amount of light loss is associated with a width $\delta$ of a light beam in an effective area. Here, the width $\delta$ is expressed in the following expression (2):

$$\delta = |\Delta_1| \cdot D/f \qquad (2).$$

Here, D denotes an effective diameter of a lens cell of a first fly's eye lens 9, f denotes a focal length of the first fly's eye lens 9, and "·" is an operator indicating multiplication.

When the radius of curvature of the lens cell of the first fly's eye lens 9 is set appropriately so that $\Delta_1$ becomes close to zero, the width $\delta$ of the light beam in the effective area becomes close to zero and thus the amount of light loss is reduced. On the other hand, when $\Delta_1$ is changed so as to be further away from zero, the width $\delta$ of the light beam in the effective area gradually increases and thus the amount of light loss increases. In short, the coefficient A in the expression (1) denotes a degree to which a position at which a split light beam maximally converges is corrected.

Thus, even though the radii of curvature of the lens cells of the first fly's eye lens 9 are individually changed, the degree to which the convergent point $\Delta_1$ of the split light beam is corrected can be prevented from being too small or too large as long as the width $\delta$ falls within a range that satisfies the expression (1). Thus, the amount of light loss can be expected to be reduced well.

Preferably, the expression (3) below is satisfied:

$$\delta/E \leq 1/10 \qquad (3).$$

Here, E denotes an effective area of a lens cell of the second fly's eye lens, and $\delta$ denotes the width of a light beam in the effective area. When the expression (3) is satisfied, the width $\delta$ of the light beam falls within 10% of the size of the effective area and consequently a clear projection image can be produced. On the other hand, if the width $\delta$ exceeds a range that satisfies the expression (1), the amount of light is reduced. For this reason, it is preferable that the radii of curvature of the lens cells of the first fly's eye lens be set so as to satisfy the expression (3).

More preferably, the expression (3a) below is satisfied:

$$\delta/E \leq 1/20 \qquad (3a).$$

Still more preferably, the expression (3b) below is satisfied:

$$\delta/E \approx 0 \qquad (3b).$$

When the expression (3b) is satisfied, A in the expression (1) is approximately equal to 1.

The effect of reducing the amount of light loss can be obtained if at least one of the lens cells that constitute the first and second fly's eye lenses is set to satisfy either the expression (1) or (3). It is, however, preferable that a larger number of lens cells or all the lens cells be set to satisfy the above expressions.

Figures 3A, 3B:
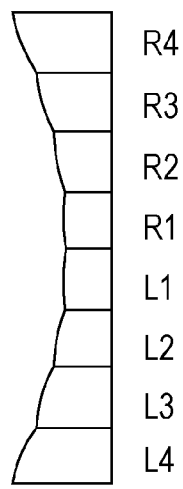
FIG. 3A illustrates an example of a decentered fly's eye lens according to an embodiment of the present invention.
FIG. 3B is a table indicating properties of lens cells of the fly's eye lens.

FIGS. 3A and 3B illustrate an example of lens cells of the first fly's eye lens having radii of curvature set with consideration of the refractive power of the converging lens 8. FIG. 3A is a schematic diagram of the first fly's eye lens and FIG. 3B is a table including the thickness, focal length, and radius of curvature of each lens cell illustrated in FIG. 3A. Cell numbers in FIG. 3A correspond to cell numbers in FIG. 3B. In the example illustrated in FIGS. 3A and 3B, the converging lens 8 has a positive refractive power $\phi$ that is equal to 0.01644. In the properties listed in the table of FIG. 3B, the radii of curvature of the lens cells of the first fly's eye lens are set in view of the refractive power $\phi$ of the converging lens 8 and spacing between the first fly's eye lens 9 and the second fly's eye lens such that the split light beams maximally converge at principal points of the corresponding lens cells of the second fly's eye lens.

In a study performed by the inventors of the present application, it was found that, in the case where the radii of curvature are set individually as illustrated in the table of FIG. 3B, illumination efficiency is improved by approximately 2.0% compared to the case where the radii of curvature of all the lens cells are set to 28.29 mm, which is the radius of curvature of lens cells adjacent to the optical axis in the table of FIG. 3B.

Figure 4A:
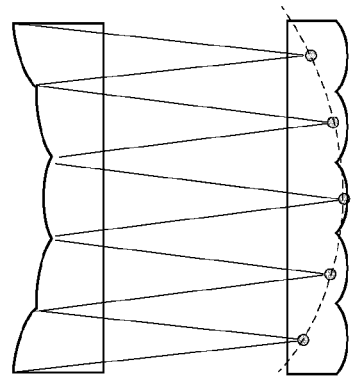
FIGS. 4A and 4B illustrate convergent points of split light beams.
Figure 4B:
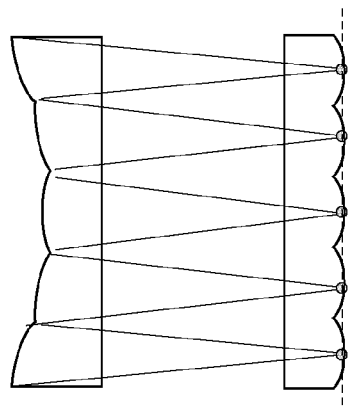

As has been described above, if all the lens cells of the first fly's eye lens have the same radius of curvature, the convergent points of the split light beams are displaced from the effective areas of the corresponding lens cells of the second fly's eye lens due to the difference in thickness between the lens cells in the optical axis direction, as illustrated in FIG. 4A. In contrast, when the radii of curvature of the lens cells of the first fly's eye lens are appropriately set, the light beams converge at appropriate positions and the curved surfaces of the lens cells are continuous with one another. Accordingly, it is possible to provide an illumination optical system that can reduce the amount of light loss while the occurrence of shadows in an illumination area is reduced and the yield of fly's eye lenses is improved.

In the first embodiment, although it is only the first fly's eye lens 9 that includes decentered lens cells, decentered lens cells may be included in the second fly's eye lens 10 instead, or may be included in both the first fly's eye lens 9 and the second fly's eye lens 10.

In the structure according to the first embodiment, the converging lens 8 having a positive refractive power and the parabolic reflector 2 are disposed on a side that is closer to the light source 1 than the first fly's eye lens 9. However, the present invention is also applicable to a structure that includes an elliptical reflector or a concave lens having a negative refractive power. That is, the present invention is applicable to any structure in which the radius of curvature of each lens cell of the first fly's eye lens is set with consideration of the refractive power of all the optical elements, including a reflector, which are disposed on a side that is closer to the light source 1 than the first fly's eye lens 9 is.

If the condenser lens 6 is capable of superposing split light beams on the liquid crystal display element, the condenser lens 6 may be a concave mirror.

Not all the lens cells of the first fly's eye lens have to be formed such that the curved surfaces of the lens cells are continuous with one another. The present invention is applicable to any structure that includes a decentered lens cell, which has a curved surface that is continuous with curved surfaces of adjacent lens cells and which has a radius of curvature that is made different from those of other lens cells. Even in this structure, the effect of reducing the amount of light loss can be obtained while the occurrence of shadows in projection images is reduced.

Second Embodiment

Figure 5:
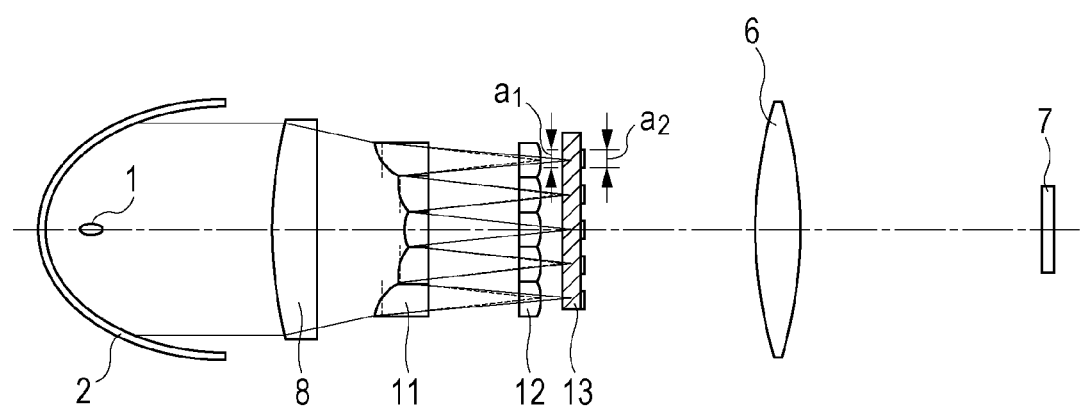
FIG. 5 is a schematic diagram of an illumination optical system according to a second embodiment of the present invention.

FIG. 5 is a schematic diagram illustrating an illumination optical system according to a second embodiment of the present invention. Light emitted from a light source 1 is reflected by a parabolic reflector 2 and becomes substantially parallel light beams. The substantially parallel light beams are incident on a converging lens 8 and changed into converged light by the converging lens 8. The converged light is incident on a first fly's eye lens 11 formed by arranging rectangular lens cells, which have similar figures to the liquid crystal display element 7, in a matrix.

Lens cells constituting the first fly's eye lens 11 are decentered, and the decentering amounts increase stepwise from a lens cell near the optical axis toward a lens cell in a peripheral portion. Furthermore, the thicknesses of the lens cells increase stepwise the closer a lens cell is disposed to a peripheral portion so that the curved surfaces of the lens cells are substantially continuous with one another.

In the split light beam that has been incident on each lens cell of the first fly's eye lens 11, part of the light beam passing through the center of the lens cell becomes substantially parallel to the optical axis due to decentering of the lens cell. The split light beam converges at a position near the polarization conversion element 13. In FIG. 5, a1 denotes an incident-side effective area of the polarization conversion element 13 and a2 denotes an emerging-side effective area of the polarization conversion element 13. Multiple split light beams that converge near the polarization conversion element 13 and diverge again are superposed on the liquid crystal display element 7 by the condenser lens 6.

Figure 6A:
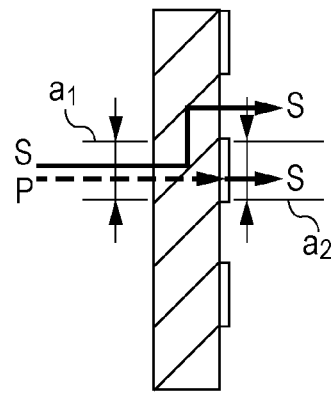
FIGS. 6A to 6C each schematically illustrate a polarization conversion element and a convergent point of a split light beam.

FIG. 6A is a schematic diagram of the polarization conversion element 13. The polarization conversion element 13 includes multiple prismatic polarizing beam splitters and half-wave plates. Each polarizing beam splitter has a polarization splitting film. The half-wave plates are disposed on surfaces of every other polarizing beam splitter from which light beams emerge. In FIG. 6A, a1 denotes an incident-side distance between the polarization splitting film and a reflection film that are obliquely disposed at approximately 45 degrees with respect to the incident surface. Light that is incident on the polarization conversion element 13 is split into P-polarized light and S-polarized light by the polarization splitting film. The S-polarized light is reflected by the adjacent reflection film in the same direction as the P-polarized light travels, and is then emitted through a space between two adjacent half-wave plates. The P-polarized light split by the polarization splitting film is converted into S-polarized light by the half-wave plate disposed on the emerging surface and then emitted. In FIG. 6A, a2 denotes an emerging-side distance between the polarization splitting film and the reflection film. In the above manner, unpolarized light that is incident on the polarization conversion element 13 is converted into S-polarized light. Here, the polarization conversion element 13 may convert light into P-polarized light.

Figure 6B:
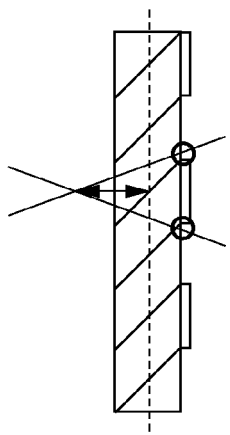
Figure 6C:
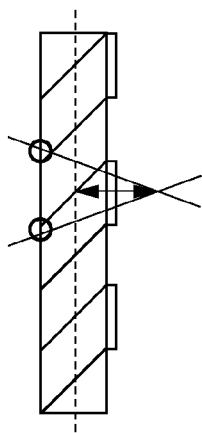
Figure 14:
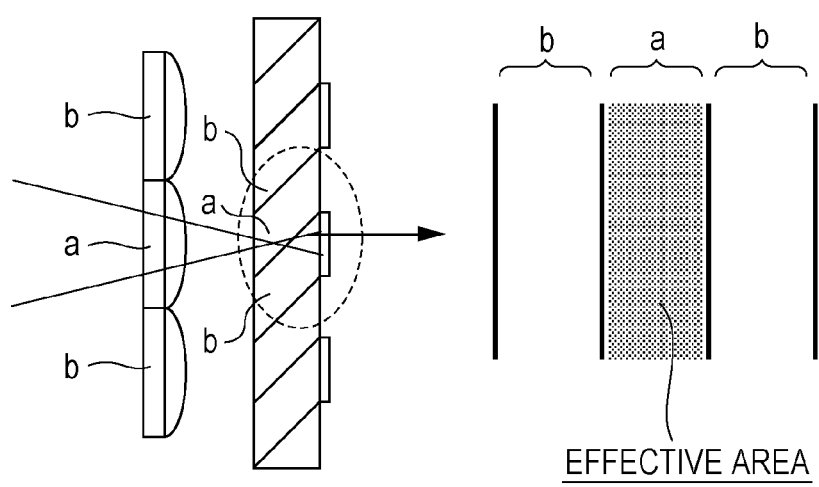
FIG. 14 is a schematic diagram of an effective area of a polarization conversion element.

As illustrated in FIGS. 6B and 6C, if a position at which a split light beam split by the first fly's eye lens maximally converges is outside the polarization conversion element 13, the width of the split light beam on the incident surface and the emerging surface of the polarizing beam splitter increases excessively. If part of light beam travels outside of an effective area (shaded part in FIG. 14) of the polarizing beam splitter having a width that is equivalent to that of one side of the polarizing beam splitter, P-polarized light that is supposed to be converted into S-polarized light is emitted as it is without being converted to the S-polarized light, or S-polarized light is converted into unwanted P-polarized light and then emitted. As a result, efficiency in polarization conversion is reduced and the amount of light loss is increased. FIG. 14 schematically illustrates a first lens array, a polarization conversion element, and incident light on the left, and illustrates an effective area of the polarizing beam splitter surrounded by the dotted line in an enlarged manner on the right.

As described in the first embodiment, light loss occurs not only in the polarization conversion element 13. If parts of light beams emerging from lens cells of the first fly's eye lens 11 travel outside of effective areas of the corresponding lens cells of the second fly's eye lens 12, the parts of light beams result in light loss.

The thicknesses of the lens cells of the first fly's eye lens 11 in the optical axis direction increase, the closer a lens cell is disposed to a peripheral portion. Accordingly, the principal points of lens cells of the first fly's eye lens 11 are displaced more in a translational manner toward the light source, the closer a lens cell is disposed to a peripheral portion. If all the lens cells of the first fly's eye lens 11 have the same radius of curvature, light beams maximally converge at positions that are farther from the effective areas of the polarization conversion element 13 the closer a lens cell is disposed to a peripheral portion. Consequently, the width of the split light beam in the effective area increases, and light loss occurs.

Generally, the size of each effective area of the polarization conversion element 13 is set to be approximately half the size of the effective area of a corresponding lens cell of the second fly's eye lens 12. As described in the first embodiment, the amount of light loss is determined by a ratio of the width δ of the split light beam to the size of the effective area. Accordingly, when the width of a light beam in the effective area of the polarization conversion element 13 is the same as the width of a light beam in the effective area of the lens cell of the second fly's eye lens 12, the amount of light loss becomes larger in the effective area of the polarization conversion element 13.

For this reason, in this embodiment, the radii of curvature of the lens cells of the first fly's eye lens 11 are set such that the split light beams maximally converge to the corresponding effective areas of the polarization conversion element 13. More specifically, the radii of curvature of lens cells of the first fly's eye lens 11 increase, the closer a lens cell is disposed to a peripheral portion. In this manner, an illumination optical system that reduces an amount of light loss can be provided. Furthermore, since the curved surfaces of the lens cells of the first fly's eye lens 11 are continuous with one another, the illumination optical system is capable of reducing the width of split light beams in the effective area while the occurrence of shadows in an illumination area is reduced and the yield of fly's eye lenses in a process of producing the fly's eye lenses is improved.

Now, an exemplary range of the radius of curvature will be described. A thickness of the polarization conversion element 13 in the optical axis direction is denoted by d, and the position of an internal center d/2 of the polarization conversion element 13 in the optical axis direction is taken as a datum position. As described in the first embodiment, a position at which a split light beam split by a lens cell having the radius of curvature being not appropriately set maximally converges is denoted by $\Delta_2$ with respect to the datum position, which is the internal center d/2. The position $\Delta_2$ takes a positive value on the liquid crystal display element side of the datum position in the optical axis direction, and takes a negative value on the light source side of the datum position in the optical axis direction. A position at which a split light beam split by a lens cell of the first fly's eye lens 11 according to the second embodiment having the radius of curvature being appropriately set maximally converges is denoted by $-B \times \Delta_2$. Here, it is desirable that the radius of curvature of a lens cell of the first fly's eye lens 11 be set such that a coefficient B satisfies the following expression (4):

$$0.5 \leq B \leq 1.5 + (d/2)/\Delta_2 \qquad (4).$$

As described in the first embodiment, it is considered that the amount of light loss is associated with a width $\delta$ of a light beam in an effective area. Here, the width $\delta$ is expressed in the expression (5) as follows:

$$\delta = |\Delta_2| \cdot D_F / f_F \qquad (5).$$

Here, $f_F$ denotes a combined focal length of the first and second fly's eye lenses 11 and 12 and $D_F$ denotes an effective diameter of a lens cell of a first fly's eye lens 11.

When $\Delta_2$ is set so as to be zero by changing the radii of curvature of the lens cell of the first fly's eye lens 11, the width $\delta$ of the light beam in the effective area becomes zero and thus the illumination efficiency becomes the maximum. If the corrected position $\Delta_2$, at which the split light beam emerging from a lens cell of the first fly's eye lens 11 having the appropriate radius of curvature maximally converges, is changed so as to be further away from zero, the width $\delta$ of the light beam in the effective area gradually increases, and thereby the amount of light loss increases. In short, the coefficient B denotes a degree of correcting the position at which a split light beam maximally converges.

The polarization conversion element 13 according to the second embodiment is different from the second fly's eye lens 10 according to the first embodiment in that the polarization conversion element 13 has effective areas on two sides, one on an incident side and the other on an emerging side. Considering that the amount of light loss of the polarization conversion element 13 changes in association with the change in $\Delta_2$, a larger one of widths $\delta$ of a light beam in the incident-side effective area and emerging-side effective area of the polarization conversion element 13 greatly affects the amount of light loss. Now, the widths of a light beam in the incident-side and emerging-side effective areas of the polarization conversion element 13 with respect to the datum position are considered. When the convergent point of the split light beam is displaced from the datum position in the positive direction or toward the liquid crystal display element, the width of the light beam in the incident-side effective area increases, whereas the width of the light beam in the emerging-side effective area reduces. Here, almost all the amount of light loss due to the increase in width of the light beam in the incident-side effective area is cancelled.

For this reason, while the convergent point of the split light beam falls within a range from the datum position of the polarization conversion element 13 to a position that is a distance d/2 away from the datum position in the positive direction, a substantially uniform illumination efficiency is obtained. Thus, a range in the second embodiment in which the illumination efficiency is appropriately improved is shifted by d/2 toward the liquid crystal display element from that in the case of the first embodiment. In view of these facts, the expression (4) is obtained by using a change of a larger one of the widths $\delta$ of a light beam on the incident side and emerging side with respect to a change of $\Delta_2$.

Even when the radii of curvature of the lens cells of the first fly's eye lens 11 are changed independently of other factors in a range that satisfies the expression (4), the degree of correcting the convergent point $\Delta_2$ of the split light beam does not become too small or too large. Thus, sufficient illumination efficiency is expected.

In the second embodiment, it is only the first fly's eye lens 11 that includes decentered lens cells, but the second fly's eye lens 12 may include decentered lens cells, instead. Alternatively, both the first fly's eye lens 11 and the second fly's eye lens 12 may include decentered lens cells.

Third Embodiment

Figure 7A:
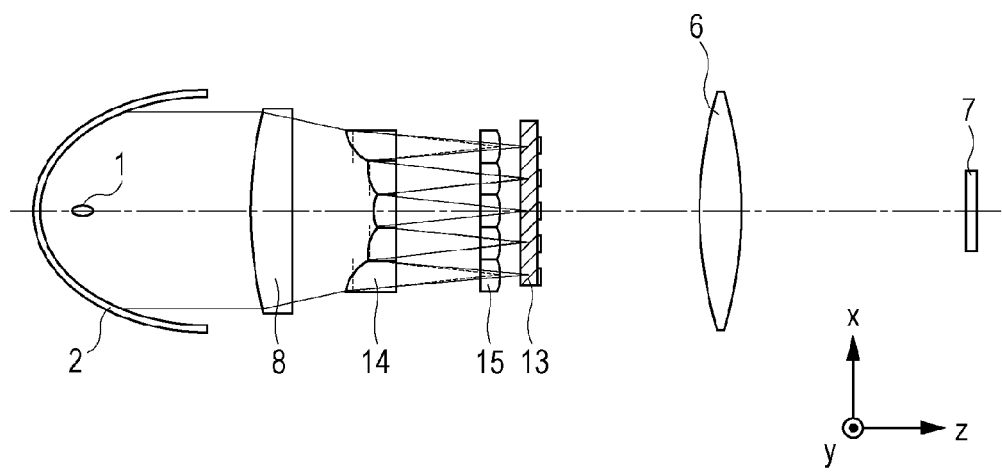
FIGS. 7A and 7B are schematic diagrams of an illumination optical system according to a third embodiment of the present invention.
Figure 7B:
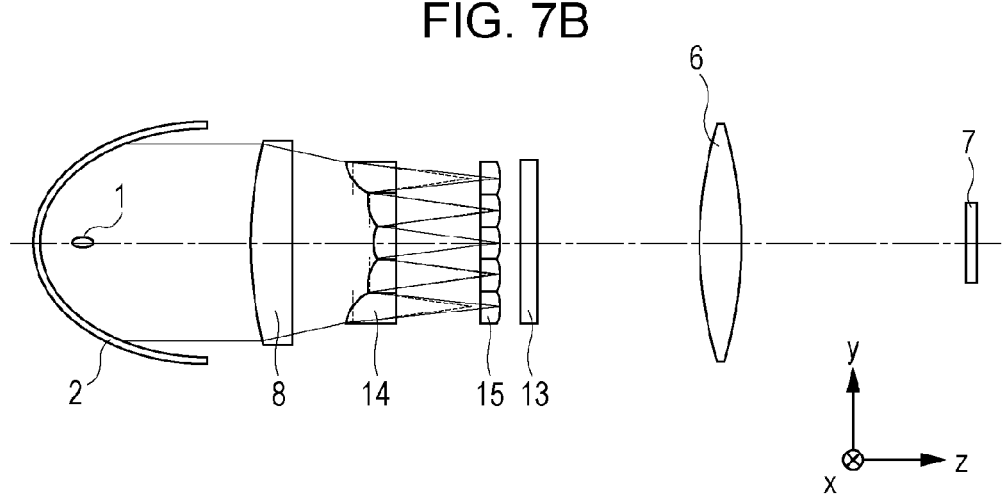

FIGS. 7A and 7B illustrate schematic diagrams of an illumination optical system according to a third embodiment of the present invention. FIG. 7A is a schematic diagram of a first cross section (taken in the X-Z directions in the drawing) and FIG. 7B is a schematic diagram of a second cross section (taken in the Y-Z directions in the drawing). The first and second cross sections are both taken along the optical axis direction and are perpendicular to each other.

Light emitted from a light source 1 is reflected by a parabolic reflector 2 and becomes substantially parallel light beams. The substantially parallel light beams are incident on a converging lens 8 and changed into converged light by the converging lens 8. The converged light is incident on a first fly's eye lens 14.

Lens cells constituting the first fly's eye lens 14 are decentered, and the decentering amounts increase stepwise from a lens cell near the optical axis toward a lens cell in a peripheral portion. Furthermore, the thicknesses of the lens cells in the optical axis direction increase stepwise the closer a lens cell is disposed to a peripheral portion so that the curved surfaces of the lens cells are substantially continuous with one another.

In the split light beam emerging from each lens cell of the first fly's eye lens 14, part of the light beam passing through the center of the lens cell becomes substantially parallel to the optical axis due to decentering of the lens cell. The split light beam converges to a corresponding one of the lens cells of the second fly's eye lens 15. The multiple split light beams emerging from the second fly's eye lens 15 are superposed on the liquid crystal display element 7 by the condenser lens 6.

Now, the first cross section of FIG. 7A out of the two cross sections taken along the optical axis and being perpendicular to each other is referred to. In the first cross section, polarization splitting films of polarizing beam splitters and half-wave plates of a polarization conversion element 13 are arranged along the first cross section (in the X-Y directions). Here, the radii of curvature of the lens cells of the first fly's eye lens 14 should be set such that the split light beams maximally converge to effective areas of the polarization conversion element 13.

If all the lens cells of the first fly's eye lens 14 have the same radius of curvature, generally, the positions at which light beams maximally converge would be farther from the effective areas of the polarization conversion element 13 the closer a lens cell of the first fly's eye lens is disposed to a peripheral portion. Consequently, the width of the split light beams in the effective areas increases, and light loss occurs.

Thus, in the third embodiment, the radii of curvature of the lens cells of the first fly's eye lens 14 are set such that a lens cell that is disposed closer to a peripheral portion has a larger radius of curvature in order that the split light beams maximally converge in the effective areas of the polarization conversion element 13 in the first cross section.

Now, the second cross section of FIG. 7B out of the two cross sections taken along the optical axis and being perpendicular to each other are referred to. In the second cross section, no effect is observed for the polarization splitting films of the polarizing beam splitters and the half-wave plates of the polarization conversion element 13 and there is no effective area as the one included in the first cross section. Here, the radii of curvature of the lens cells of the first fly's eye lens 14 should be set such that the split light beams maximally converge to effective areas of the lens cells of the second fly's eye lens 15.

If all the lens cells of the first fly's eye lens 14 have the same radius of curvature, light beams maximally converge at positions that are farther from the effective areas of the lens cells of the second fly's eye lens 15 the closer a lens cell of the first fly's eye lens is disposed to a peripheral portion. Consequently, the widths of the split light beams in the effective areas increase, and light loss occurs.

In the third embodiment, the radii of curvature of the lens cells of the first fly's eye lens 14 are set such that a lens cell that is disposed closer to a peripheral portion has a larger radius of curvature in order that the split light beams maximally converge in the effective areas of the lens cells of the second fly's eye lens 15 in the second cross section.

As has been described above, it is possible to provide an illumination optical system that can reduce the amount of light loss. To be more specific, the amount of light loss can be reduced by reducing the widths of split light beams in corresponding effective areas while the occurrence of shadows in an illumination area is reduced and the yield of fly's eye lenses in a process of producing the fly's eye lenses is improved.

By focusing on the fact that convergent points of a split light beam that affect reduction of the amount of light loss are different for different cross sections, another effect of reducing the amount of light loss can be obtained in the third embodiment by forming a decentered lens cell that has different radii of curvature for the first and second cross sections.

In the third embodiment, it is only the first fly's eye lens 14 that includes decentered lens cells, but the second fly's eye lens 15 may include decentered lens cells, instead. Alternatively, both the first fly's eye lens 14 and the second fly's eye lens 15 may include decentered lens cells.

Even in a case where a lens cell has different decentering amounts between the first and second cross sections, the above effects of the embodiment can be obtained.

Fourth Embodiment

Figure 8:
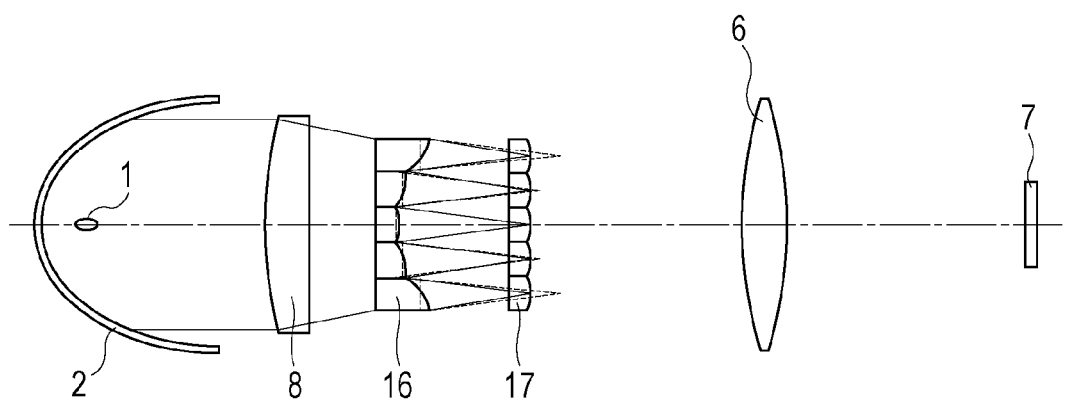
FIG. 8 is a schematic diagram of an illumination optical system according to a fourth embodiment of the present invention.

FIG. 8 is a schematic diagram illustrating an illumination optical system according to a fourth embodiment of the present invention. Light emitted from a light source 1 is reflected by a parabolic reflector 2 and becomes substantially parallel light beams. The substantially parallel light beams are incident on a converging lens 8 and changed into converged light by the converging lens 8. The converged light is incident on a first fly's eye lens 16.

Lens cells constituting the first fly's eye lens 16 are decentered, and the decentering amounts increase stepwise from a lens cell near the optical axis toward a lens cell in a peripheral portion. Furthermore, the thicknesses of the lens cells in the optical axis direction increase stepwise the closer a lens cell is disposed to a peripheral portion so that the curved surfaces of the lens cells are substantially continuous with one another.

Curved surfaces of the lens cells constituting first fly's eye lens 16 face a second fly's eye lens 17. Distances between lens cells of the first fly's eye lens 16 and corresponding lens cells of the second fly's eye lens 17 reduce stepwise, the closer a lens cell of the first fly's eye lens 16 is disposed to a peripheral portion from the center of the optical axis.

In the split light beam that has been incident on and split by each lens cell of the first fly's eye lens 16, part of the light beam passing through the center of the lens cell becomes substantially parallel to the optical axis due to decentering of the lens cell. The split light beam converges to a corresponding one of the lens cells of the second fly's eye lens 17.

The multiple split light beams emerging from the second fly's eye lens 17 are superposed on a liquid crystal display element 7 by a condenser lens 6.

If all the lens cells of the first fly's eye lens 16, from the one near the optical axis to the one near a peripheral portion, have the same radius of curvature, the split light beams maximally converge at positions that are farther from the effective areas of the lens cells of the second fly's eye lens 15 the closer a lens cell of the first fly's eye lens 16 is disposed to a peripheral portion. Consequently, the widths of the split light beams in the effective areas increase, and illumination efficiency is reduced.

In the fourth embodiment, the radii of curvature of the lens cells of the first fly's eye lens 16 are set such that a lens cell that is disposed closer to a peripheral portion has a smaller radius of curvature in order that the split light beams maximally converge in the effective areas of the lens cells of the second fly's eye lens 17. In other words, the radius of curvature of at least two lens cells of the first fly's eye lens 16 is set such that a split light beam forms an image of the light source 1 between, in the optical axis direction of the lens cell, a surface vertex of a curved surface of a corresponding one of the lens cells of the second fly's eye lens 17 and a contact point at which the corresponding lens cell of the second fly's eye lens 17 is in contact with an adjacent lens cell. With this setting, the width of the split light beam in the effective area can be reduced, and thus illumination efficiency can be improved.

Here, a split light beam forms an image of the light source 1 at a position at which the light beam maximally converges, and the imaging magnification thereof is proportional to the focal length of the first fly's eye lens 16. In the forth embodiment, the radii of curvature of the lens cells of the first fly's eye lens 16 are smaller or the focal lengths of the lens cells of the first fly's eye lens 16 are shorter the closer a lens cell is disposed to a peripheral portion. Thus, the imaging magnification at which lens cells of the first fly's eye lens 16 form images of the light source 1 is smaller than in the case where all the lens cells have the same radius of curvature. That is, in the fourth embodiment, an effect of reducing the width of a light beam in an effective area is obtained not only by appropriately setting the radii of curvature but also by reducing the imaging magnification at which an image of the light source 1 is formed.

As has been described above, it is possible to provide an illumination optical system that can improve illumination efficiency. To be more specific, illumination efficiency can be improved by reducing the widths of split light beams in corresponding effective areas while the occurrence of shadows in an illumination area is reduced and the yield of fly's eye lenses in a process of producing the fly's eye lenses is improved.

Fifth Embodiment

Figure 9:
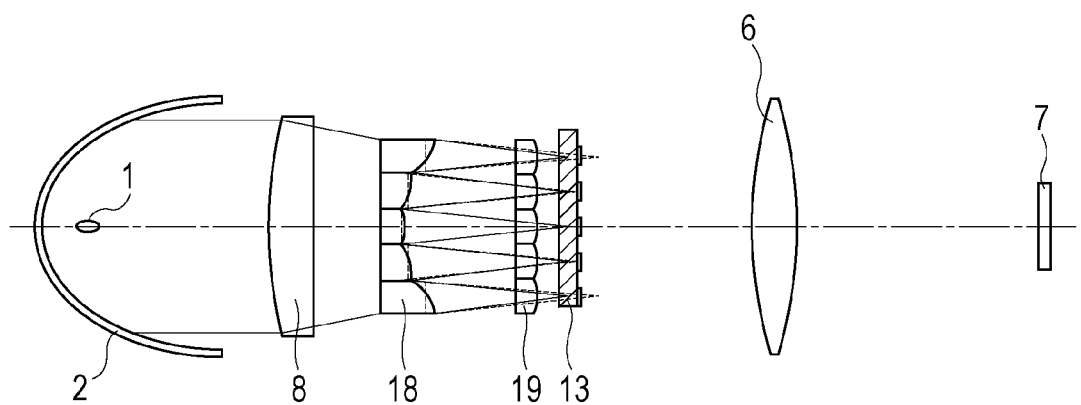
FIG. 9 is a schematic diagram of an illumination optical system according to a fifth embodiment of the present invention.

FIG. 9 is a schematic diagram illustrating an illumination optical system according to a fifth embodiment of the present invention. Light emitted from a light source 1 is reflected by a parabolic reflector 2 and becomes substantially parallel light beams. The substantially parallel light beams are incident on a converging lens 8 and changed into converged light by the converging lens 8. The converged light is incident on a first fly's eye lens 18.

Lens cells constituting the first fly's eye lens 18 are decentered, and the decentering amounts increase stepwise from a lens cell near the optical axis toward a lens cell in a peripheral portion. Furthermore, the thicknesses of the lens cells in the optical axis direction increase stepwise the closer a lens cell is disposed to a peripheral portion so that the curved surfaces of the lens cells are substantially continuous with one another.

Curved surfaces of the lens cells constituting the first fly's eye lens 18 face a second fly's eye lens 19. Distances between the lens cells of the first fly's eye lens 16 and the corresponding lens cells of the second fly's eye lens 17 reduce stepwise, the closer a lens cell is disposed to a peripheral portion from the center of the optical axis.

In the split light beam that has been incident on and split by each lens cell of the first fly's eye lens 18, part of the light beam passing through the center of the lens cell becomes substantially parallel to the optical axis due to decentering of the lens cell. The split light beam converges to a corresponding effective area of a polarization conversion element 13.

The multiple split light beams emerging from the polarization conversion element 13 are superposed on a liquid crystal display element 7 by a condenser lens 6.

If all the lens cells of the first fly's eye lens 18 have the same radius of curvature, light beams maximally converge at positions that are farther from the effective areas of the polarization conversion element 13 the closer a lens cell of the first fly's eye lens 18 is disposed to a peripheral portion. Consequently, the width of the split light beams in the effective areas increases, and illumination efficiency is reduced.

In the fifth embodiment, the radii of curvature of the lens cells of the first fly's eye lens 18, from the one near the center of the optical axis to the one in a peripheral portion, are set such that a lens cell that is disposed closer to a peripheral portion has a smaller radius of curvature in order that the split light beams maximally converge in the effective areas of the polarization conversion element 13. With this setting, the width of the split light beams in the effective areas can be reduced, and thus illumination efficiency can be improved.

Here, a split light beam forms an image of the light source 1 at a position at which the light beam maximally converges, and the imaging magnification thereof for the case where the split light beam forms an image via a second fly's eye lens 19 is proportional to a combined focal length of the first and second fly's eye lenses 18 and 19. The combined focal length $f_F$ of the first and second fly's eye lenses 18 and 19 is determined by the following expression (6):

$$f_F = f_1 \times f_2 / \{f_1 + f_2 - (L - \alpha)\} \quad (6).$$

Here, $f_1$ and $f_2$ respectively denote the focal lengths of the first and second fly's eye lenses. L denotes a distance between principal points of a lens cell of the first fly's eye lens and a corresponding lens cell of the second fly's eye lens for the case where the lens cells are not subjected to thickness correction, the distance being caused due to decentering. In addition, $\alpha$ denotes an amount of change in distance between the lens cells, the amount of change being caused by the thickness correction. Each reference character denotes a generalized relationship for a combination of lens cells of the first and second fly's eye lenses and is not limited to a specific combination of lens cells.

Generally, a focal length $f_2$ of the second fly's eye lens is assigned to a distance between lens cells. Thus, the expression (6) is changed to:

$$f_F = f_1 \times f_2 / \{f_1 + f_2 - (f_2 - \alpha)\} = f_1 / (f_1 + \alpha) \times f_2 \quad (7).$$

In the fifth embodiment, the radii of curvature of the lens cells of the first fly's eye lens 18 are smaller or the focal lengths $f_1$ of the lens cells of the first fly's eye lens 18 are shorter the closer a lens cell is disposed to a peripheral portion. The focal length $f_1$ is changed by reducing the coefficient $f_1/(f_1+\alpha)$ of $f_2$ in the expression (7), in such a direction that a combined focal length is reduced. Thus, an image of the light source 1 formed by the lens cells of the first and second fly's eye lenses becomes smaller than in the case where all the lens cells have the same radius of curvature. That is, in the fifth embodiment, an effect of reducing the width of a light beam in an effective area is obtained not only by correcting the distance between the position of the effective area and the position at which a split light beam maximally converges but also by reducing the imaging magnification at which an image of the light source 1 is formed.

As has been described above, it is possible to provide an illumination optical system that can improve illumination efficiency. To be more specific, illumination efficiency can be improved by reducing the widths of split light beams in corresponding effective areas while the occurrence of shadows in an illumination area is reduced and the yield of fly's eye lenses in a process of producing the fly's eye lenses is improved.

In the fifth embodiment, even if the radii of curvature of the lens cells of the first fly's eye lens increase stepwise from a lens cell near the optical axis toward a lens cell in a peripheral portion, the same effects will be obtained.

Sixth Embodiment

Figure 10:
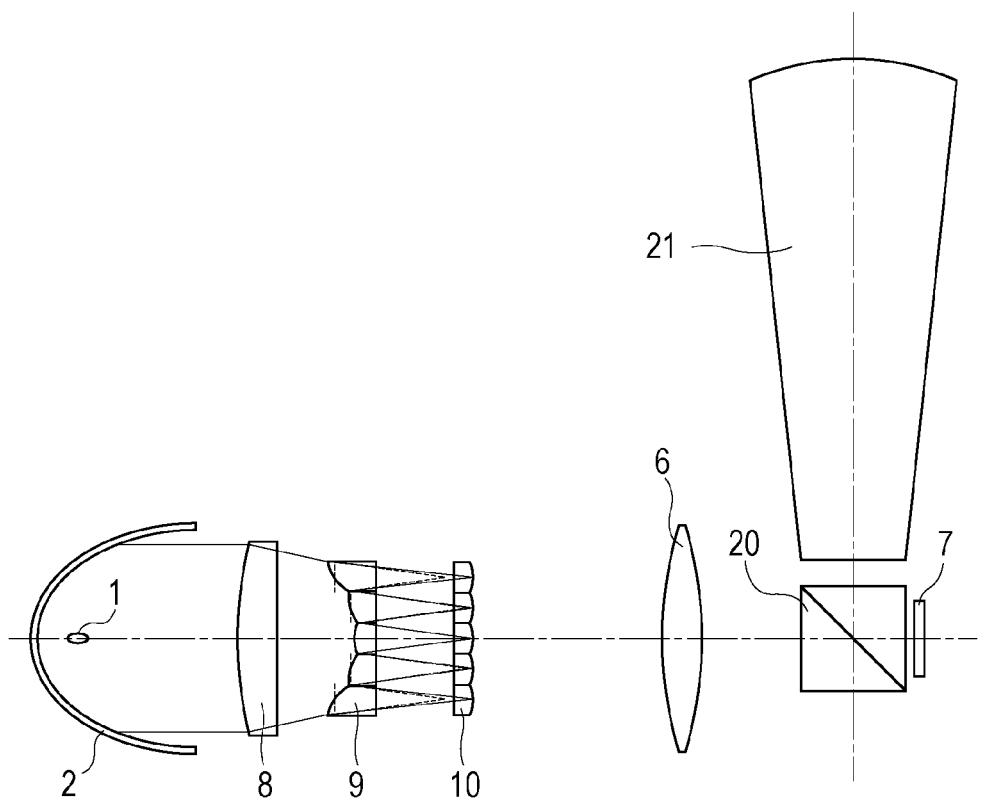
FIG. 10 is a schematic diagram of an image projection apparatus according to a sixth embodiment of the present invention.
Figure 11A:
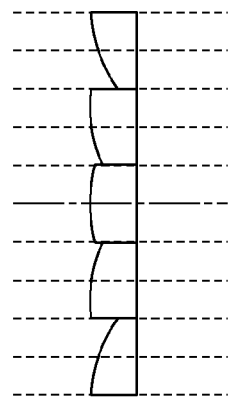
FIGS. 11A and 11B are schematic diagrams of fly's eye lenses formed of decentered lens cells.
Figure 11B:
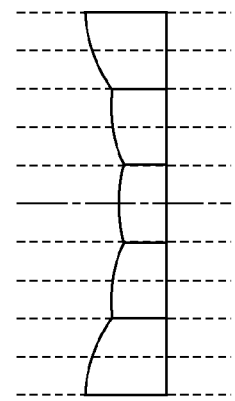
Figure 12:
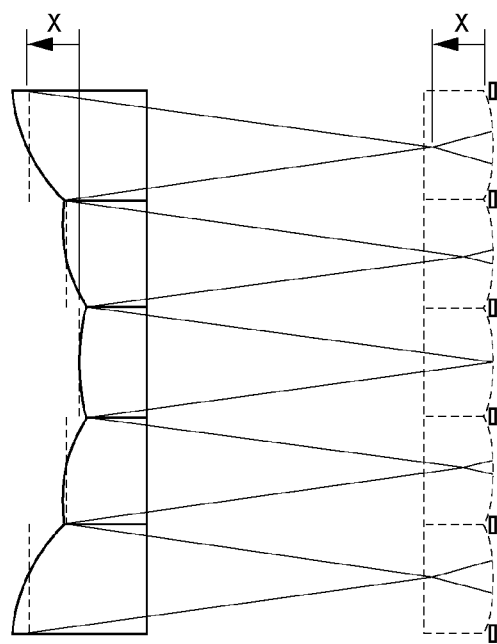
FIG. 12 is a schematic diagram of convergent points of split light beams that have passed through curved surfaces of decentered lens cells that are continuous with one another.

FIG. 10 is a schematic diagram illustrating an image projection apparatus using the illumination optical system according to the first embodiment. FIG. 10 illustrates a light source 1, a parabolic reflector 2, a converging lens 8, a first fly's eye lens 9, a second fly's eye lens 10, a condenser lens (optical element) 6, a liquid crystal display element 7, a polarizing beam splitter 20, and a projection lens (optical projecting unit) 21. The first fly's eye lens 9 is formed by arranging rectangular lens cells, which have similar figures to the liquid crystal display element 7, in a matrix. The second fly's eye lens 10 includes multiple lens cells corresponding to the lens cells of the first fly's eye lens 9.

In the sixth embodiment, a liquid crystal display element of a reflective type is employed. The liquid crystal display element 7 is efficiently illuminated by the illumination optical system according to the first embodiment. Here, the polarizing beam splitter 20 that is disposed in front of the reflective liquid-crystal display panel 7 allows only a P-polarized component of light emitted from the light source 1 to pass therethrough to the reflective liquid-crystal display panel 7. An S-polarized component of the light having its polarizing state controlled by the reflective liquid-crystal display panel 7 is reflected by the polarizing beam splitter 20 and projected by the projection lens 21 on a projection plane (screen) in an enlarged manner.

Here, a polarization conversion element may be disposed to the rear of the second fly's eye lens 10 to improve illumination efficiency. Furthermore, the liquid crystal display element is not limited to the reflective liquid crystal display element, and may be a transmission liquid crystal display element, instead.

As described above, according to the first to sixth embodiments of the present invention, since the radii of curvature of decentered lens cells are appropriately set, the amount of light loss can be reduced.

Among differences between positions of surface vertices of any two lens cells of the first fly's eye lens according to the embodiments of the present invention, the largest difference is denoted by $gap_{max}$. Among distances between surface vertices of lens cells of the first fly's eye lens and corresponding lens cells of the second fly's eye lens, the shortest distance is denoted by $L_{min}$. Here, in order to sufficiently improve illumination efficiency as an effect obtainable in the embodiments, it is preferable that $gap_{max} > L_{min}/20$ be satisfied.

It is more preferable that $L_{min}/5 > gap_{max} > L_{min}/20$ be satisfied.

A difference, in the optical axis direction, between focus points (at which the diameter of a light beam is the smallest) of any two lens cells of the first fly's eye lens according to the embodiments of the present invention is denoted by $f_{gap}$. Here, it is preferable that $f_{gap} < L_{min}/10$ be satisfied. In other words, it is preferable that $f_{gap}$ not include the largest one of the differences between focus points of any two lens cells of the first fly's eye lens. It is more preferable that $f_{gap} < L_{min}/20$ be satisfied.

Furthermore, in FIGS. 1, 7B, 8, and 10, an average of distances, in the optical axis direction, between focus points of the lens cells of the first fly's eye lens and surface vertices of the corresponding lens cells of the second fly's eye lens is denoted by $d1_{ave}$. Here, it is preferable that $d1_{ave} < L_{min}/10$ be satisfied. It is more preferable that $d1_{ave} < L_{min}/20$ be satisfied.

The largest one of the distances, in the optical axis direction, between focus points of the lens cells of the first fly's eye lens and surface vertices of the corresponding lens cells of the second fly's eye lens is denoted by $d1_{max}$. Here, it is preferable that $d1_{max} < L_{min}/5$ be satisfied. It is more preferable that $d1_{max} < L_{min}/10$ be satisfied.

In FIGS. 5, 7A, and 9, an average of distances, in the optical axis direction, between focus points of the lens cells of the first and second fly's eye lenses and corresponding positions of the polarization conversion element on the center line (indicated by dotted lines in FIGS. 6B and 6C, for example) in the optical axis direction is denoted by $d2_{ave}$. Here, it is preferable that $d2_{ave} < L_{min}/10$ be satisfied. It is more preferable that $d2_{ave} < L_{min}/20$ be satisfied.

The largest one of distances, in the optical axis direction, between focus points of the lens cells of the first and second fly's eye lenses and corresponding positions of the polarization conversion element on the center line (indicated by dotted lines in FIGS. 6B and 6C, for example) in the optical axis direction is denoted by $d2_{max}$. Here, it is preferable that $d2_{max} < L_{min}/5$ be satisfied. It is more preferable that $d2_{max} < L_{min}/10$ be satisfied.

In the above inequalities, each position of the polarization conversion element on the center line in the optical axis direction may be interchanged with a position at which part of a light beam passing through the center of the second fly's eye lens in parallel to the optical axis is incident on a polarization splitting film of the polarization conversion element (a position at which a light path of the part of the light beam and the polarization splitting film intersect with each other).

In the first and second embodiments, a fly's eye lens has a structure in which lens cells are arranged such that the radii of curvature of the lens cells are symmetric with respect to a first axis that crosses the optical axis and that is parallel to the y axis. However, the present invention is not limited to this structure, and the radii of curvature of the lens cells may be asymmetric with respect to the first axis. In addition, the radii of curvature of the lens cells may be asymmetric with respect to a second axis that crosses the optical axis and that is parallel to the x axis.

In the first and second embodiments, a fly's eye lens having lens cells two-dimensionally arranged is described. However, the effect of reducing the amount of light loss can be obtained even by adopting a one-dimensional cylindrical fly's eye lens. In this case, it is only required, for example, to set the radii of curvature of two cylindrical lenses in a cylindrical lens array such that split light beams converge at appropriate positions.

In addition, not all the lens cells in half an area that is divided by the first axis or second axis have to have different radii of curvature. The amount of light loss can be reduced as long as the radii of curvature of at least two lens cells are appropriately set.

In another embodiment, a second lens array may include decentered lens cells. If the second lens array includes decentered lens cells and curved surfaces of the lens cells are continuous with one another, principal points of the lens cells are displaced in accordance with decentered shapes. For example, if the lens cells each have a decentered shape such that the lens cell has a flat surface on the light source side and a concave surface on the liquid crystal display element side, a principal point of a lens cell that is disposed farther from the optical axis is displaced closer to the liquid crystal display element. On the other hand, if the lens cells each have a decentered shape such that each lens cell has a flat surface on the light source side and a convex surface on the liquid crystal display element side, a principal point of a lens cell that is disposed farther from the optical axis is displaced closer to the light source. Even in this embodiment, the effects of the other embodiments can be obtained by making two lens cells of the first lens array have different radii of curvature so that light beams maximally converge to principal planes of the lens cells of the second lens array. In other words, the decentering amounts of lens cells of the first lens array can be set such that split light beams split by the first lens array maximally converge at positions on or around the principal planes of the decentered lens cells of the second lens array. For example, an illumination optical system may be employed that includes, in order from the light source side, an elliptical reflector, a negative lens, a first lens array, and a second fly's eye lens, the first lens array having a convex surface on the light source side and a flat surface on the liquid crystal display element side, and the second fly's eye lens having a flat surface on the light source side and a concave surface on the liquid crystal display element side. Even in this case, the effects of the other embodiments can be obtained by making two lens cells of the first lens array have different radii of curvature so that split light beams maximally converge to principal planes of the lens cells of the second lens array.

In another embodiment, lens cells of a first lens array are decentered in a direction that is opposite to the direction in which the lens cells of the first lens array according to the first embodiment are decentered, and a polarization conversion element is disposed on a side that is closer to the liquid crystal display element than the first lens array is. In this case, the lens cells are decentered such that a lens cell disposed on the outer side of the first lens array is decentered to a larger degree toward a light axis of the illumination optical system than a lens cell on the inner side of the first lens array. In other words, this is the case where the center of curvature of a curved surface of the outer lens cell is shifted toward the light axis of the illumination optical system with respect to the middle position of a pitch of the lens cell, to a larger degree than the inner lens cell. In this case, the thickness of the outer lens cell needs to be smaller than that of the inner lens cell so that curved surfaces of adjacent lens cells are continuous with one another. Here, a distance between the principal planes of outer lens cells of the first and second lens arrays is smaller than a distance between the principal planes of inner lens cells of the first and second lens arrays. In this embodiment of the present invention, among at least two lens cells in the first lens array each having a curved surface that is continuous with curved surfaces of adjacent lens cells, an outer lens cell that is disposed further outward from the optical axis of the illumination optical system has a smaller radius of curvature than an inner lens cell that is disposed closer to the optical axis. With this setting, convergent points of split light beams emerging from the at least two lens cells are made less likely to be displaced due to decentering of lens cells of the first lens array. Accordingly, illumination efficiency can be improved.

In another embodiment, a first lens array includes no decentered lens cell and a second lens array includes at least two lens cells each having a curved surface that is continuous with curved surfaces of adjacent lens cells. Even in this embodiment, an effect of improving illumination efficiency can be obtained by making the radii of curvature of at least two lens cells of the first lens array different from each other such that split light beams maximally converge to principal planes of lens cells of the second lens array.

Although the embodiments of the present inventions have been described thus far, the present invention is not limited to these embodiments. Various changes and modification can be made or embodiments can be combined within a scope of the gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-089374 filed Apr. 13, 2011 and No. 2012-033155 filed Feb. 17, 2012, which are hereby incorporated by reference herein in their entirety.

What is claimed is:

1. An illumination optical system comprising:
   a first lens array including a plurality of lens cells that split a light beam emitted from a light source into a plurality of light beams;
   a second lens array including lens cells on which the light beams split by the lens cells of the first lens array are incident;
   an optical element configured to illuminate an image display element by superposing light beams emerging from the second lens array on the image display element; and
   a polarization conversion element that polarizes the light beams emerging from the second lens array to a uniform polarization direction, the polarization conversion element including a plurality of polarization splitting films,
   wherein at least one of the first lens array and the second lens array includes two lens cells each having a curved surface that is formed so as to be continuous with a curved surface of an adjacent lens cell, the two lens cells being decentered,
   wherein, in a cross section in which the two lens cells are decentered, the two lens cells of the first lens array have different radii of curvature, and
   wherein, when a cross section taken in a direction in which the plurality of polarization splitting films of the polarization conversion element are arranged is taken as a first cross section and a cross section that is taken along an optical axis of the illumination optical system and that is perpendicular to the first cross section is taken as a second cross section, a position at which the light beam split by each of the two lens cells maximally converges in the second cross section is closer to the light source than a position at which the light beam split by each of the two lens cells maximally converges in the first cross section.

2. The illumination optical system according to claim 1, wherein the first lens array includes the two lens cells each having a curved surface that is formed so as to be continuous with a curved surface of an adjacent lens cell, the two lens cells being decentered, and
   wherein in the cross section in which the two lens cells are decentered, the two lens cells have different radii of curvature.

3. The illumination optical system according to claim 1, wherein among the two lens cells having different radii of curvature, a lens cell that is disposed farther from an optical axis of the second lens array has a larger radius of curvature than that of a lens cell that is disposed closer to the optical axis of the second lens array.

4. The illumination optical system according to claim 2, wherein the radii of curvature of the two lens cells having different radii of curvature are set such that light beams split by the two lens cells each form an image of the light source between, in an optical axis direction of the lens cell, a surface vertex of a curved surface of a corresponding one of the lens cells of the second lens array and a contact point at which the corresponding lens cell is in contact with an adjacent lens cell.

5. The illumination optical system according to claim 1, wherein the radii of curvature of the two lens cells having different radii of curvature are set such that light beams split by the two lens cells each maximally converge at a principal plane of a corresponding one of the lens cells of the second lens array.

6. The illumination optical system according to claim 1, wherein each of the lens cells of the first lens array is decentered.

7. The illumination optical system according to claim 1, wherein the first lens array has a concave surface on a light source side.

8. The illumination optical system according to claim 1, wherein the radii of curvature of the two lens cells having different radii of curvature are set such that light beams split by the two lens cells maximally converge inside the polarization conversion element.

9. The illumination optical system according to claim 1, wherein, when the center of the polarization conversion element in a thickness direction, which is an optical axis direction of the illumination optical system, is taken as a datum position, the radii of curvature of the two lens cells having different radii of curvature are set such that the light beams split by the two lens cells maximally converge at the datum position.

10. The illumination optical system according to claim 1, wherein radii of curvature of the two lens cells in the second cross section are smaller than radii of curvature of the two lens cells in the first cross section.

11. An image projection apparatus, comprising:
   an illumination optical system configured to illuminate an image display element with light emitted from a light source; and
   a projecting optical system configured to project an image formed by the image display element on a projection plane,
   wherein the illumination optical system includes
      a first lens array including a plurality of lens cells that split a light beam emitted from the light source into a plurality of light beams,
      a second lens array including lens cells on which the light beams split by the lens cells of the first lens array are incident,
      an optical element configured to illuminate the image display element by superposing light beams emerging from the second lens array on the image display element, and
      a polarization conversion element that polarizes the light beams emerging from the second lens array to a uniform polarization direction, the polarization conversion element including a plurality of polarization splitting films,
   wherein at least one of the first lens array and the second lens array includes two lens cells each having a curved surface that is formed so as to be continuous with a curved surface of an adjacent lens cell, the two lens cells being decentered,
   wherein, in a cross section in which the two lens cells are decentered, the two lens cells of the first lens array have different radii of curvature, and
   wherein, when a cross section taken in a direction in which the plurality of polarization splitting films of the polarization conversion element are arranged is taken as a first cross section and a cross section that is taken along an optical axis of the illumination optical system and that is perpendicular to the first cross section is taken as a second cross section, a position at which the light beam split by each of the two lens cells maximally converges in the second cross section is closer to the light source than a position at which the light beam split by each of the two lens cells maximally converges in the first cross section.

* * * * *